ns Patent Office
3,706,681
Patented Dec. 19, 1972

1

3,706,681
PROCESS FOR STABILIZING A MECHANICALLY FROTHED URETHANE FOAM BY USING A SILICON SURFACTANT COMPOSITION
Richard A. Bachura, Midland, Mich., assignor to Dow-Corning Corporation, Midland, Mich.
No Drawing. Filed Mar. 4, 1971, Ser. No. 121,134
Int. Cl. C08g 22/44
U.S. Cl. 260—2.5 AH
5 Claims

ABSTRACT OF THE DISCLOSURE

The preparation of mechanically frothed polyurethane foams using a composition consisting essentially of a mixture of 1 to 10 parts by weight of a copolymer composed of $SiO_2$ units and units selected from the group consisting of $(CH_3)_3SiO_{1/2}$ and $Q(CH_3)_2SiO_{1/2}$ units, wherein Q is a solubilizing group, and 0.1 to 2 parts by weight of a silicone-glycol copolymer is disclosed.

In the preparation of mechanically frothed polyurethane foams with the heretofore available silicone surfactants, various problems were met. For example, pruning or shrinkage of the foam might occur, and the compatibility with the system left something to be desired. It has been found that when the compositions and processes of this invention are employed that the aforementioned problems, and others, can be substantially minimized if not completely eliminated.

This invention relates to a composition for preparing mechanically frothed polyurethane foams which consists essentially of a mixture of 1 to 10 parts by weight of a copolymer composed of $SiO_2$ units and units selected from the group consisting of $(CH_3)_3SiO_{1/2}$ and $Q(CH_3)_2SiO_{1/2}$ units, wherein Q is a radical containing a solubilizing group, and the ratio of $SiO_2$ units to the total $(CH_3)_3SiO_{1/2}$ and $Q(CH_3)_2SiO_{1/2}$ units is in the range of 1:0.4 to 1:1.2, and 0.1 to 2 parts by weight of a silicone-glycol copolymer of the formula $(CH_3)_3SiO\{(CH_3)_2SiO\}_n\{(CH_3)GSiO\}_mSi(CH_3)_3$ wherein $n$ has an average value of from 1 to 420, $m$ has an average value of from 1 to 30, and G is a radical of the structure $-D(OR)_xA$ wherein D is an alkylene radical containing from 1 to 18 carbon atoms, R is composed of ethylene radicals and radicals selected from the group consisting of propylene and butylene radicals, the amount of ethylene radicals relative to the other alkylene radicals being such that the ratio of carbon atoms to oxygen atoms in the total OR block ranges from 2:1 to 2.8:1, $x$ has an average value from 6 to 100, and A is a capping group selected from the group consisting of the $-OR'$, $-O\overset{O}{\overset{\|}{C}}R'$, and $-O\overset{O}{\overset{\|}{C}}OR'$ radicals wherein R' is a hydrogen atom or a hydrocarbon radical free of aliphatic unsaturation which contains from 1 to 10 carbon atoms.

One essential component of the above composition is the copolymer composed of $SiO_2$ units and units selected from the group consisting of $(CH_3)_3SiO_{1/2}$ and $Q(CH_3)_2SiO_{1/2}$ units. In this copolymer the Q radical, when present, is a radical which contains a solubilizing group. The purpose of the solubilizing group in the Q radical is to make the copolymer compatible with the other ingredients in the polyurethane foam formulation. By compatible it is meant

2 that the copolymer is at least partially soluble and/or dispersible in the urethane foam composition. Examples of solubilizing groups that can be employed in the Q radical are the carboxyl, ester, amide, amino, mercapto, halohydrocarbon, nitrile, nitro, carbonyl, higher hydrocarbon groups and the glycol. Of these groups, the glycol is preferred at the present time.

The above copolymer must have a ratio of $SiO_2$ units to the total $(CH_3)_3SiO_{1/2}$ and $Q(CH_3)_2SiO_{1/2}$ units in the range of 1:0.4 to 1:1.2. Preferably, the ratio is in the range of 1:0.6 to 1:1. These copolymers and their method of preparation by various techniques is known. Also, some of them are commercially available. For those wanting more detailed information on these copolymers and their preparation, attention is directed to U.S. Patents Nos. 2,676,182, 3,511,788 and 3,527,659, the disclosures of which are incorporated herein by reference. The copolymer constitutes 1 to 10 parts, preferably 2 to 5 parts, by weight of the composition.

The second essential component of the composition of this invention is a silicone-glycol copolymer of the formula $(CH_3)_3SiO\{(CH_3)_2SiO\}_n\{(CH_3)GSiO\}_mSi(CH_3)_3$.

In the silicone-glycol copolymer the number of dimethylsiloxane units is defined by $n$ which can have an average value of from 1 to 420, but preferably has an average value in the range of 25 to 200. The number of methylglycol siloxane units is defined by $m$, which can have an average value of from 1 to 30, and $m$ preferably is in the range of 5 to 15.

The glycol portion of the silicone-glycol copolymer is defined by the symbol G which is a radical of the structure $-D(OR)_xA$. In this structure D can be any alkylene radical containing from 1 to 18 carbon atoms. Thus D can be a methylene, ethylene, propylene, isopropylene, butylene, isobutylene, hexylene, octylene, decylene, dodecylene, hexadecylene or an octadecylene radical. It is preferred that D be an alkylene radical containing from 2 to 6 carbon atoms.

The R radical in the glycol portion of the copolymer is composed of radicals selected from the group consisting of ethylene, propylene and butylene radicals. The amount of ethylene radicals relative to the other alkylene radicals must be such that the ratio of carbon atoms to oxygen atoms in the total OR block ranges from 2:1 to 2.8:1. The total OR blocks in the glycol portion is defined by $x$ which has an average value in the range of 6 to 100. It is preferred that $x$ have an average value in the range of 25 to 75.

The final portion of the glycol is A which is a capping group selected from the group consisting of the $-OR'$, $-O\overset{O}{\overset{\|}{C}}R'$ and $-O\overset{O}{\overset{\|}{C}}OR'$ radicals wherein R' is a hydrogen atom or a hydrocarbon radical free of aliphatic unsaturation which contains from 1 to 10 carbon atoms. By way of illustration, the glycol can be hydroxyl, ether, carboxyl, acyloxy, carbonate or ester capped. Specific examples of R', in addition to the hydrogen atom, include the methyl, ethyl, propyl, butyl, isopropyl, cyclohexyl, phenyl, tolyl, benzyl, and decyl radicals. The silicone-glycol copolymers useful herein and their various methods of preparation are well known. Also, some of them are commercially available. For those wanting more detailed information on these materials and their preparation, attention is directed to U.S. Patents Nos. 3,398,104, 3,402,192, 3,518,288 and Re. 25,727 the disclosures of which are incorporated herein by reference. The silicone-glycol copolymer makes up 0.1 to 2 parts, preferably 0.5 to 1.5 parts by weight of the composition.

In use the composition of this invention is simply added to the polyurethane foam formulation at the time one normally would add the silicone surfactant. For example, all the ingredients including the composition of the invention, with the exception of the isocyanate, are mixed together and mechanically frothed. Then the isocyanate is added and mixed into the foam and the foam cured. Another example is that all ingredients including the composition of this invention, with the exception of the catalyst, are mixed together and mechanically frothed and then the catalyst is added and mixed in.

Thus it can be seen that this invention also relates to an improvement in a process of preparing a polyurethane foam which includes the mechanical frothing of the foam, the improvement comprising incorporating into the foam composition the composition of this invention as defined above, the weights of both said copolymers being based on 100 parts by weight of the polyol present in the polyurethane foam composition.

It should be noted at this point that the actual means of mechanically frothing the foam is not critical so far as is known at this time. It can vary from a simple whipping or beating of the composition by hand; to mechanical frothing with conventional mixers, such as modified Oakes machines, the Texacote foamer, the Mohr foamer, the Uromatic foamer or the Hobart mixer; to the use of highly sophisticated mechanical frothing means such as the apparatus described in U.S. Patent 2,764,565.

The particular polyurethane foam composition to which the instant composition is added can be of any type so far as is known at this time. Thus, the present composition can be used in making flexible, semirigid and rigid foams. It is most useful, however, in making the latter two kinds of foams as those are the systems where the aforementioned problems have been acute. Since the components which go into these polyurethane foams are well known to those skilled in the art, and for the sake of brevity, no detailed information is set forth here on those materials. There is incorporated by reference, however, U.S. Patents Nos. 2,764,565, 3,398,104, 3,402,192, 3,518,288, and the monograph "Polyurethanes," by Bernard A. Dombrow, Reinhold Publishing Corporation, New York, 1957, for those who wish a detailed description of these basic components, all of which are readily available.

Now in order that those skilled in the art may better understand how the present invention can be practiced, the following examples are given by way of illustration and not by way of limitation. All parts and percents referred to herein are on a weight basis, and all viscosities measured at 25° C., unless otherwise specified.

EXAMPLE 1

To the mixer bowl of a Hobart Mixer (Model N-50) there was added 50 g. of a trimethylolpropane initiated trifunctional polyol having a molecular weight of 740 and a hydroxyl number of 232, 50 g. of a trimethylolpropane initiated trifunctional polyol, having a molecular weight of 1535 and a hydroxyl number of 110, 2 g. of a xylene solution (50% solids) of a copolymer composed of $SiO_2$ units and $(CH_3)_3SiO_{1/2}$ units in which the ratio of $SiO_2$ units to the $(CH_3)_3SiO_{1/2}$ units is in the range of 1:0.4 to 1:1.2, 1 g. of a silicone-glycol copolymer of the general formula

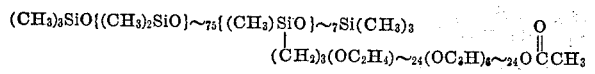

0.4 g. of dibutyltin dilaurate and 0.25 g. of zinc stearate. The foregoing were mixed at the number 2 mixing setting for 30 seconds and then 21.3 ml. of toluene diisocyanate (80/20 ratio of the 2,4 and 2,6 isomers) was added and mixing continued for 3.5 minutes. The foamed materials were then poured into a paper bucket and allowed to free rise. Finally, a sample of the foam was cured in an oven for about 10 minutes at 200°–220° F. A good soft foam was obtained.

EXAMPLE 2

The procedure of Example 1 was repeated except that the zinc stearate was omitted and the first mixing time was 3 minutes instead of 30 seconds. A good soft foam was obtained.

EXAMPLE 3

To the mixer bowl of a Hobart Mixer there was added 35 g. of a trimethylolpropane initiated trifunctional polyol having a molecular weight of 740 and a hydroxyl number of 232, 35 g. of a trimethylolpropane initiated trifunctional polyol having a molecular weight of 1535 and a hydroxyl number of 110, 30 g. of a glucoside based polyol having a hydroxyl number of 372, 2 g. of a xylene solution (50% solids) of a copolymer composed of $SiO_2$ units and $(CH_3)_3SiO_{1/2}$ units in which the ratio of $SiO_2$ units to the $(CH_3)_3SiO_{1/2}$ units is in the range of 1:0.4 to 1:1.2, 0.25 g. of the silicone-glycol copolymer of Example 1, and 0.3 g. of dibutyltin dilaurate. The foregoing were mixed at the number 2 mixing setting for 5 minutes and then 26.5 ml. of toluene diisocyanate (80/20 ratio of the 2,4 and 2,6 isomers) was added and mixing continued for 2 minutes. The foamed materials were then poured into a paper bucket and allowed to free rise. Finally, a sample of the foam was cured in an oven for about 10 minutes at 200–220° F. A fairly good brown semirigid foam with coarse cells was obtained. The foam had a small void on the bottom of the container but no pruning was observed.

EXAMPLE 4

The procedure of Example 3 was repeated except that 5 g. of a polymeric plasticizer was added to the first mix, and 0.5 g. of the silicone-glycol copolymer of Example 1 was used. A yellow somewhat soft semirigid foam was obtained. Only very slight pruning was observed.

EXAMPLE 5

The procedure of Example 4 was repeated except that 10 g. of the polymeric plasticizer was used and the first mixing time was 7½ minutes instead of 5 minutes. A good natural colored semirigid foam was obtained. It had a density of less than 7.0 pounds per cubic foot.

EXAMPLE 6

The procedure of Example 5 was repeated with substantially identical results being obtained. The foam had a density of 6.38 pounds per cubic foot.

EXAMPLE 7

The procedure of Example 5 was repeated except that 1.5 g. of the solution of the copolymer composed of $SiO_2$ and $(CH_3)_3SiO_{1/2}$ units was used. Substantially identical results were obtained. The foam was brown in color and had a density of 6.61 pounds per cubic foot.

EXAMPLE 8

To a one quart paper cup there was added 35 g. of a trimethylolpropane initiated trifunctional polyol having a molecular weight of 740 and a hydroxyl number of 232, 35 g. of a trimethylolpropane initiated trifunctional polyol having a molecular weight of 1535 and a hydroxyl number of 110, 30 g. of a glucoside based polyol having a hydroxyl number of 372, 2 g. of a xylene solution (50% solids) of a copolymer composed of $SiO_2$ units and $(CH_3)_3SiO_{1/2}$ units in which the ratio of $SiO_2$ units to the $(CH_3)_3SiO_{1/2}$ units is in the range of 1:0.4 to 1:1.2, 0.5 g. of the silicone-glycol copolymer of Example 1 and 0.3 g. of dibutyltin dilaurate. The foregoing ingredients were mixed for 30 seconds at 1500 r.p.m. using a Hamilton Beach Mixer. Then 26.2 ml. of toluene diisocyanate (80/20 ratio of the 2,4 and 2,6 isomers) was added and the entire liquid mass mixed for 10 seconds at 1000 r.p.m. Upon completion of the mix, the ingredients were poured into a three quart paper container and allowed to free rise. After rising, the foam was cured in an oven for 10 minutes at 200°–220° F. The cured foam was cut while still hot and its physical appearance noted after it had cooled to room temperature. A generally good semirigid foam was obtained which was very fine celled. The foam density was about 13 pounds per cubic foot. No pruning was observed.

EXAMPLE 9

The procedure of Example 8 was repeated except that 1.5 ml. of water was added to the first mix and 38.2 ml. of the toluene diisocyanate was used. A very rigid foam with coarse cells was obtained. A rapid free rise due to the water added was noted.

EXAMPLE 10

To a one quart paper cup there was added 76 g. of a trimethylolpropane initiated trifunctional polyol having a molecular weight of 740 and a hydroxyl number of 232, 24 g. of a trimethylolpropane initiated trifunctional polyol having a molecular weight of 1535 and a hydroxyl number of 110, 2 g. of a xylene solution (50% solids) of a copolymer composed of $SiO_2$ units and $(CH_3)_3SiO_{1/2}$ units in which the ratio of $SiO_2$ units to the $(CH_3)_3SiO_{1/2}$ units is in the range of 1:0.4 to 1:1.2, 1 ml. of water, 0.5 g. of the silicone-glycol copolymer of Example 1, and 0.3 g. of dibutyltin dilaurate. The foregoing ingredients were mixed for 30 seconds at 1500 r.p.m. using a Hamilton Beach Mixer. Then 33.2 ml. of toluene diisocyanate (80/20 ratio of the 2,4 and 2,6 isomers) was added and the entire composition mixed for 10 seconds at 1000 r.p.m. Upon completion of the mix, the ingredients were poured into a three quart paper container and allowed to free rise. After rising, the foam was cured in an oven for 10 minutes at 200°–220° F. The cured foam was cut while still hot and its physical appearance noted after it had cooled to room temperature. A good foam with very coarse cells was obtained and no pruning of the foam observed.

EXAMPLE 11

The procedure of Example 10 was repeated except that 1.2 g. of the solution of the copolymer composed of $SiO_2$ and $(CH_3)_3SiO_{1/2}$ units was used and 0.6 g. of the silicone-glycol copolymer was used. A good fine celled foam with some bottom pruning was obtained.

EXAMPLE 12

The procedure of Example 11 was repeated except that 1.5 g. of the solution of the copolymer composed of $SiO_2$ and $(CH_3)_3SiO_{1/2}$ units was used. A good foam with somewhat coarse cells and some bottom pruning was obtained.

EXAMPLE 13

The procedure of Example 11 was repeated except that 0.45 g. of the silicone-glycol copolymer was used. A very good semirigid foam was obtained. No pruning of the foam was observed.

EXAMPLE 14

The procedure of Example 13 was repeated except that different lots of the solution of the copolymer composed of $SiO_2$ and $(CH_3)_3SiO_{1/2}$ units, and the silicone-glycol copolymer were used. Substantially identical results were obtained with a very small amount of shrinkage at the bottom of the foam being observed. No change in the cured foam was observed after it had been aged overnight.

EXAMPLE 15

The precedure of Example 14 was repeated except that 2.4 g. of the solution of the copolymer composed of $SiO_2$ and $(CH_3)_3SiO_{1/2}$ units was used and 0.9 g. of the silicone-glycol copolymer was used. Substantially identical results were obtained with a slight void in the bottom of the foam being noted. No change in the cured foam was observed after it had been aged overnight.

EXAMPLE 16

The procedure of Example 14 was repeated except that 0.4 g. of a dipropylene glycol solution of triethylenediamine (33% amine solids) was also added to the first mix. A good semirigid, very fine celled foam was obtained. Some shrinkage of the foam was noted with the center of the foam being concave. After the cured foam was aged overnight, wrinkles on the top skin were noted.

EXAMPLE 17

The procedure of Example 14 was repeated except that 0.6 g. of 50/50 weight mixture of stannous octoate and dioctyl phthalate was substituted for the 0.3 g. of dibutyltin dilaurate. This system was much faster curing than that of Example 14. A good, very fine celled foam with shrinkage around the edges was obtained. After the cured foam was aged overnight, no shrinkage was observed.

EXAMPLE 18

The procedure of Example 14 was repeated except that the amount of dibutyltin dilaurate used was 0.2 g. and 0.4 g. of a dipropylene glycol solution of triethylenediamine (33% amine solids) was also added to the first mix. A good foam with almost no shrinkage was obtained. Also, the foam was less concave on the bottom, and had fewer surface wrinkles after overnight aging, that the foam of Example 16.

EXAMPLE 19

The procedure of Example 16 was repeated except that 2 g. of water was used and 41.2 ml. of the toluene diisocyanate added. A good, rather firm foam with slightly coarse cells was obtained, but no pruning or shrinkage of the foam was observed. After the cured foam was aged overnight it had a somewhat brittle feel but no shrinkage was observed.

EXAMPLE 20

To a one quart paper cup there was added 50 g. of a glycerine initiated polypropylene glycol trifunctional polyol having a hydroxyl number in the range of 224 to 259, 50 g. of a glycerine initiated polypropylene glycol difunctional polyol having a hydroxyl number in the range of 84.4 to 90.5, 1.5 g. of a xylene solution (50% solids) of a copolymer composed of $SiO_2$ units and $(CH_3)_3SiO_{1/2}$ units in which the ratio of $SiO_2$ units to the $(CH_3)_3SiO_{1/2}$ units is in the range of 1:0.4 to 1:1.2, 1 g. of water, 0.5 g. of the silicone-glycol copolymer of Example 1, and 1 g. of a mixture of stannous octoate and dioctyl phthalate (50/50 by weight). The above components were mixed for 30 seconds at 1500 r.p.m. using a Hamilton Beach Mixer. Then 29.3 ml. of toluene diisoocyanate (80/20 ratio of the 2,4 and 2,6 isomers) was added and mixed in for 10 seconds at 1000 r.p.m. When mixing was complete the foam was poured into a three quart paper container and allowed to free rise. After rising, the foam was cured in an oven for 10 minutes at 200°–220° F. The cured foam was cut while still hot and its physical appearance noted after it had cooled to room temperature. A good semirigid foam which exhibited only very slight shrinkage was obtained.

EXAMPLE 21

The procedure of Example 20 was repeated except that only 0.7 g. of the stannous octoate dioctyl phthalate mixture was used. Substantially identical results were obtained with no shrinkage of the foam being observed.

EXAMPLE 22

A mixture consisting of 100 parts of a 3000 molecular weight trifunctional polyol having a hydroxyl number of about 56, 50 parts of a 1500 molecular weight trifunctional polyol having a hydroxyl number of about 112, 50 parts of a polyfunctional polyol having a hydroxyl number in the range of 330 to 350, 12 parts of a xylene solution (50% solids) of a copolymer composed of $SiO_2$ units and (CH₃)₃SiO₁/₂ units in which the ratio of SiO₂ units to the (CH₃)₃SiO₁/₂ units is in the range of 1:0.4 to 1:1.2, 2 parts of a xylene solution (50% solids) of a copolymer composed of SiO₂ units, (CH₃)₃SiO₁/₂ units and {H₂C=CHCH₂O(C₂H₄O)~₁₂}(CH₃)₂SiO₁/₂ units in which the ratio of SiO₂ units to the total (CH₃)₃SiO₁/₂ and {H₂C=CHCH₂O(C₂H₄O)~₁₂}(CH₃)₂SiO₁/₂ units is in the range of 1:0.4 to 1:1.2. This copolymer was prepared by heating a mixture of 90 parts of a xylene solution (~50% Solids) of a copolymer composed of SiO₂ units and (CH₃)₃SiO₁/₂ units as described above, 10 parts of a glycol of the formula

H₂C=CHCH₂O(C₂H₄O)~₁₂H and a tin catalyst at reflux for about 4 hours, the hydroxyl groups of the glycol reacting with the residual SiOH groups on the copolymer to form the product.) 1 part of the silicone-glycol copolymer of Example 1, 2 parts of a dye, and 43.8 parts of toluene diisocyanate (80/20 ratio of the 2,4 and 2,6 isomers) were mixed and mechanically frothed for 10 minutes using a Hobart Mixer at a number 2 speed setting. Then 2 parts of catalyst, a 20% solution of phenylmercuric propionate, was added and mixing continued 1 minute at a speed setting of number 1, followed by 1 minute at a speed setting of number 2, and concluding with 1 minute at a speed setting of number 1. The foam was oven cured for about 8 minutes at about 200° to 220° F. The foam had a density of about 15 pounds per cubic foot.

EXAMPLE 23

The procedure of Example 22 was repeated except that the quantities employed were doubled, the first mixing was 8 minutes, and after the catalyst was added, mixing was for 2 minutes at a speed setting of number 2 followed by 2 minutes at a speed setting of number 1. The foam was coated at about ¼" thickness on the back of a piece of needle-punch type polypropylene indoor/outdoor carpet and then cured. The foam formed a good backing on the carpet.

EXAMPLE 24

When copolymers composed of SiO₂ and (CH₃)₃SiO₁/₂ units in which the ratios of SiO₂ units to the (CH₃)₃SiO₁/₂ units is in the range of 1:0.6 to 1:1 or 1:0.6 to 1:0.8 are substituted for the copolymer of the preceding examples, equivalent results are obtained.

EXAMPLE 25

When the silicone-glycol copolymers set forth below are substituted for the silicone-glycol copolymer of the previous examples, equivalent results are obtained.

(A)

(CH₃)₃SiO{(CH₃)₂SiO}₁₈{(CH₃)SiO}₃Si(CH₃)₃
            |
            (CH₂)₃(OC₂H₄)₂₂(OC₃H₆)₁₇OCCH₃
                                        ‖
                                        O (B)

(CH₃)₃SiO{(CH₃)₂SiO}₁₉₅{(CH₃)SiO}₁₅Si(CH₃)₃
            |
            (CH₂)₂(OC₂H₄)₃₈(OC₃H₆)₂₇OC₄H₉

(C)

(CH₃)₃SiO{(CH₃)₂SiO}₂₅₀{(CH₃)SiO}₈₀Si(CH₃)₃
            |
            (CH₂)₆(OC₂H₄)₅₀(OC₃H₆)₄₅(OC₄H₈)₂OCH₃

(D)

(CH₃)₃SiO{(CH₃)₂SiO}₁₅{(CH₃)SiO}₃Si(CH₃)₃
            |
            (CH₂)₃(OC₂H₄)₁₂OH (E)

(CH₃)₃SiO{(CH₃)₂SiO}{(CH₃)SiO}Si(CH₃)₃
            |
            (CH₂)₄(OC₂H₄)₅(OC₃H₆)₆OCCH₃
                                    ‖
                                    O

That which is claimed is:

1. In a process of preparing a polyurethane foam which includes the mechanical frothing of the foam, the improvement which comprises incorporating into the foam composition a composition consisting essentially of a mixture of 1 to 10 parts by weight of a copolymer composed of SiO₂ units and units selected from the group consisting of (CH₃)₃SiO₁/₂ and Q(CH₃)₂SiO₁/₂ units, wherein Q is a radical containing a solubilizing group selected from the group consisting of the carboxyl, ester, amide, amino, mercapto, halohydrocarbon, nitrile, nitro, carbonyl, higher hydrocarbon and the glycol groups, and the ratio of SiO₂ units to the total (CH₃)₃SiO₁/₂ and Q(CH₃)₂SiO₁/₂ units is in the range of 1:0.4 to 1:1.2, and 0.1 to 2 parts by weight of a silicone-glycol copolymer of the formula (CH₃)₃SiO{(CH₃)₂SiO}ₙ{(CH₃)GSiO}ₘSi(CH₃)₃ wherein $n$ has an average value of from 1 to 420, $m$ has an average value of from 1 to 30, and G is a radical of the structure —D(OR)ₓA wherein D is an alkylene radical containing from 1 to 18 carbon atoms, R is composed of ethylene radicals and radicals selected from the group consisting of propylene and butylene radicals, the amount of ethylene radicals relative to the other alkylene radicals being such that the ratio of carbon atoms to oxygen atoms in the total OR block ranges from 2:1 to 2.8:1, $x$ has an average value from 6 to 100, and A is a capping group selected from the group consisting of the $$-OR', \quad -O\overset{O}{\underset{\|}{C}}R' \quad \text{and} \quad -O\overset{O}{\underset{\|}{C}}OR'$$

radicals wherein R' is a hydrogen atom or a hydrocarbon radical free of aliphatic unsaturation which contains from 1 to 10 carbon atoms, the weights of both said copolymers being based on 100 parts by weight of the polyol present in the polyurethane foam composition.

2. The process as defined in claim 1 wherein the composition incorporated into the foam composition consists essentially of 2 to 5 parts of a copolymer composed of SiO₂ and (CH₃)₃SiO₁/₂ units, and 0.5 to 1.5 parts of the silicone-glycol copolymer wherein $n$ is 25 to 200, $m$ is 5 to 15, D contains from 2 to 6 carbon atoms, R is composed of ethylene and propylene radicals, $x$ is 25 to 75 and A is $$-O\overset{O}{\underset{\|}{C}}R'$$

3. The process as defined in claim 1 wherein the composition incorporated into the foam composition consists essentially of 2 to 5 parts of a copolymer composed of SiO₂, (CH₃)₃SiO₁/₂ and Q(CH₃)₂SiO₁/₂ units, and 0.5 to 1.5 parts of the silicone-glycol copolymer wherein $n$ is 25 to 200, $m$ is 5 to 15, D contains from 2 to 6 carbon atoms, R is composed of ethylene and propylene radicals, $x$ is 25 to 75 and A is $$-O\overset{O}{\underset{\|}{C}}R'$$

4. The process as defined in claim 1 wherein the composition incorporated into the foam composition consists essentially 2 to 5 parts of a copolymer composed of SiO₂ and (CH₃)₃SiO₁/₂ units, and 0.5 to 1.5 parts of the silicone-glycol copolymer wherein $n$ is 25 to 200, $m$ is 5 to 15, D contains from 2 to 6 carbon atoms, R is composed of ethylene and propylene radicals, $x$ is 25 to 75, and A is —OR'.

5. The process as defined in claim 1 wherein the composition incorporated into the foam composition consists essentially of 2 to 5 parts of a copolymer composed of SiO₂, (CH₃)₃SiO₁/₂ and Q(CH₃)₂SiO₁/₂ units, and 0.5 to 1.5 parts of the silicone-glycol copolymer wherein $n$ is 25 to 200, $m$ is 5 to 15, D contains from 2 to 6 carbon atoms, R is composed of ethylene and propylene radicals, $x$ is 25 to 75, and A is —OR'.

References Cited

UNITED STATES PATENTS

| | | | |
|---|---|---|---|
| 3,511,788 | 5/1970 | Keil | 260—46.5 R |
| 3,518,288 | 6/1970 | Haluska | 260—2.5 AH |
| 3,402,192 | 9/1968 | Haluska | 260—2.5 AH |
| 3,398,104 | 8/1968 | Haluska | 260—2.5 AH |

OTHER REFERENCES

| | | | |
|---|---|---|---|
| 745,227 | 7/1970 | Belgium | 260—2.5 BD |
| 720,212 | 2/1969 | Belgium | 260—2.5 AH |

OTHER REFERENCES

Derwent: Belgian Patents Report, vol. R; No. 31, abstract of Belgian Patent 745,227, report published Sept. 22, 1970.

Derwent: Belgian Patents Report No. 9/69, abstract of Belgian Patent 720,212.

DONALD E. CZAJA, Primary Examiner

C. W. IVY, Assistant Examiner

U.S. Cl. X.R.

252—351, 356, 357; 260—2.5 BD